(12) United States Patent
Koide et al.

(10) Patent No.: US 6,175,447 B1
(45) Date of Patent: Jan. 16, 2001

(54) BINOCULAR INSTRUMENT INCLUDING MOVABLE LENS PROTECTIVE STRUCTURE

(75) Inventors: Wataru Koide, Hachioji; Yuichi Torikoshi, Tsukui-gun, both of (JP)

(73) Assignee: Olympus Optical Co., Ltd., Tokyo (JP)

( * ) Notice: Under 35 U.S.C. 154(b), the term of this patent shall be extended for 0 days.

(21) Appl. No.: 09/420,027

(22) Filed: Oct. 18, 1999

(30) Foreign Application Priority Data

Oct. 19, 1998 (JP) .................................................. 10-297205

(51) Int. Cl.[7] .................................................. G02B 23/18
(52) U.S. Cl. .................................................. 359/417
(58) Field of Search .................................. 359/417, 412, 359/411, 408

(56) References Cited

U.S. PATENT DOCUMENTS 3,266,367 * 8/1966 Dowling et al. .................. 359/417
5,640,271 * 6/1997 Nishitani et al. ................. 359/412

* cited by examiner

Primary Examiner—Jon Henry
(74) Attorney, Agent, or Firm—Ostrolenk, Faber, Gerb & Soffen, LLP

(57) ABSTRACT

A binocular instrument according to the present invention basically comprises a binocular instrument body, a left-hand lens barrel supported by a supporting frame, a high-hand lens barrel supported by the body, a left-hand armor slidable in a pupil distance (distance between optical axis) adjusting direction and a right-hand armor fixed to the body. When the binocular instrument is switched from a non-using state to a using state, the left-hand armor is slid in the left direction, so that only the left-hand armor moves while the supporting frame is in the fixed condition, and the lenses are set at an open condition, thereby permitting the use of the binocular instrument. Thereafter, when the left-hand armor is slid in the same direction, the supporting frame is shifted together so that a pupil distance maximizing position is reached. According to this binocular instrument, not only the operation for switching the lenses to a sheltering state and an open state becomes simple, but also handling becomes easy, and even the structure becomes simple.

15 Claims, 9 Drawing Sheets

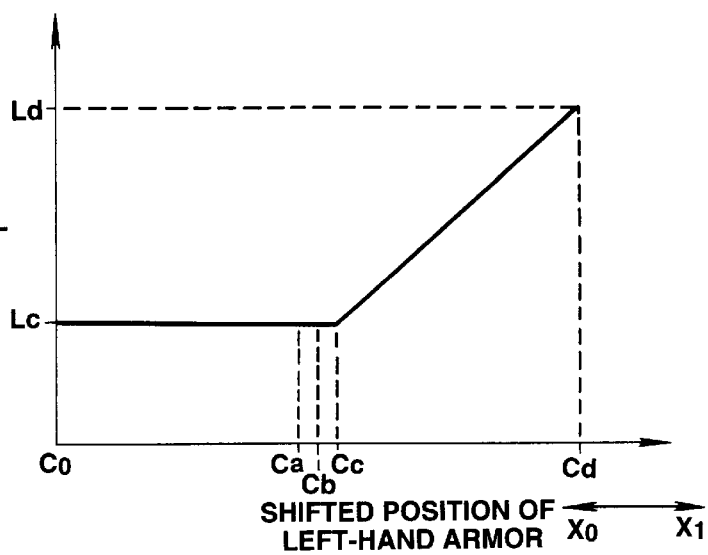
FIG.16 SHIFTED POSITION OF LEFT-HAND LENS-BARREL (SUPPORTING FRAME)
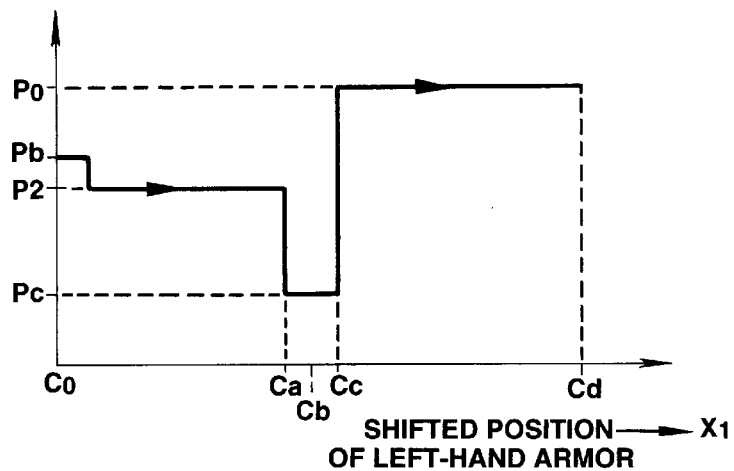
FIG.17 SHIFTING FORCE OF LEFT-HAND ARMOR
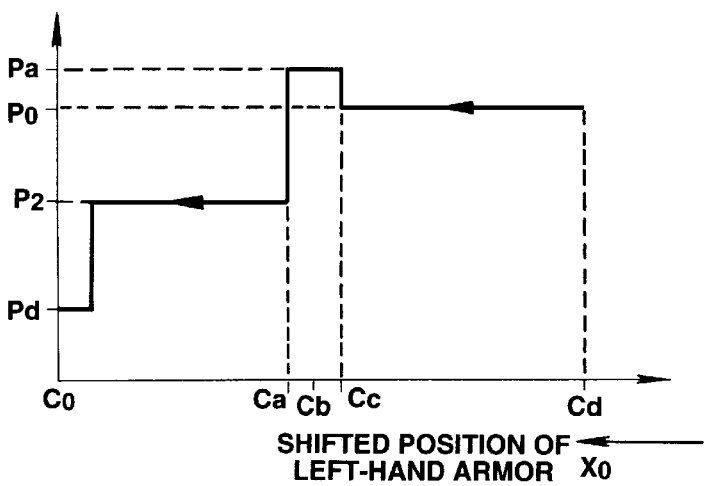
FIG.18 SHIFTING FORCE OF LEFT-HAND ARMOR

BINOCULAR INSTRUMENT INCLUDING MOVABLE LENS PROTECTIVE STRUCTURE

BACKGROUND OF THE INVENTION

1. Field of the Invention

The present invention relates to a binocular instrument (telescope and microscope) having a pair of right- and left-hand optical systems and a protective section for protection of the optical systems, where its pupil (interpupilary) distance is adjustable.

2. Related Art Statement

In general, a binocular instrument is constructed such that objectives and eyepieces are set at front and rear end portions of a pair of lens barrels in an exposed state to the external, which incurs attachment of dust and greases on the surface of the lenses if it is left as it is in non-using state (in a stored condition), so that there is a possibility of damages to the lenses when the attached dust or the like is wiped up. For this reason, lens caps have been used as lens protective members for a group of objectives and a group of eyepieces of the right- and left-hand lens barrels.

Meanwhile, since the lens cap is fitted over the barrel circumferential surface only under contact pressure, it can easily be removed therefrom by an external force or the like or can be misplaced. For preventing misplacement, there has been proposed a binocular instrument in which one end of the lens cap is connected through a string-like member to the barrel body.

However, if the lens cap is connected through a string-like member to the barrel body, the binocular instrument becomes hard to handle because the lens cap is unstable while being removed, besides its appearance is unacceptable.

SUMMARY OF THE INVENTION

Accordingly, the present invention has been developed in consideration of the above-mentioned situation, and it is an object of this invention to provide a binocular instrument capable of, in addition to switching between a using condition where lenses are open and a non-used condition where the lenses are covered and adjusting the pupil distance, facilitating the switching operation between these conditions.

According to an aspect of this invention, a binocular instrument comprises a pair of right- and left-hand lens barrels each equipped with a lens optical system, an optical-axis-separation changing mechanism for changing a distance between the optical axis of the pair of lens barrels, and a lens protective section capable of shifting to a closing position for covering the lens optical system and to an opening position for exposing an exposure surface of the lens optical system, wherein the lens protective section is driven in connection with the optical-axis-separation changing mechanism.

Furthermore, according to another aspect of this invention, a binocular instrument comprises a pair of rightand left-hand lens barrels each equipped with a lens optical system, an optical-axis-separation changing mechanism for changing a distance between the optical axis of the pair of lens barrels, and a lens protective section capable of shifting to a closing position for covering the lens optical system and to an opening position for exposing an exposure surface of the lens optical system. The optical-axis-separation changing mechanism has a first area for changing the binocular instrument to a storage state and to a use state and a second area for changing the distance between the optical axis within a predetermined range in the use state. The lens protective section is made to operate in connection with a movement of the optical-axis-separation changing mechanism in the first area and takes the closing position when the binocular instrument is in the storage state while taking the opening position when being in the use state.

The object and features of the present invention will become more readily apparent from the following description.

BRIEF DESCRIPTION OF THE DRAWINGS

FIG. 16 is an illustration of the relationship between the shifted position of the left-hand armor and the shifted position of the supporting frame of the left-hand lens barrel in the binocular instrument according to the first embodiment;

FIG. 17 is an illustration of variation of a shifting force, taking place for when the left-hand armor is shifted to each of shift positions, in the binocular instrument according to the first embodiment, showing the variation to be taken for when it is shifted from the non-using position to the using position and further shifted in the direction of maximizing the pupil distance;

FIG. 18 is an illustration of variation of a shifting force, taking place for when the left-hand armor is shifted to each of shift positions, in the binocular instrument according to the first embodiment, showing the variation to be taken for when it is shifted from the pupil distance maximizing position to the pupil distance minimizing position and further returned from the using position to the non-using position;

DETAILED DESCRIPTION OF THE PREFERRED EMBODIMENTS

Embodiments of the present invention will be described hereinbelow with reference to the drawings.

Figure 1:
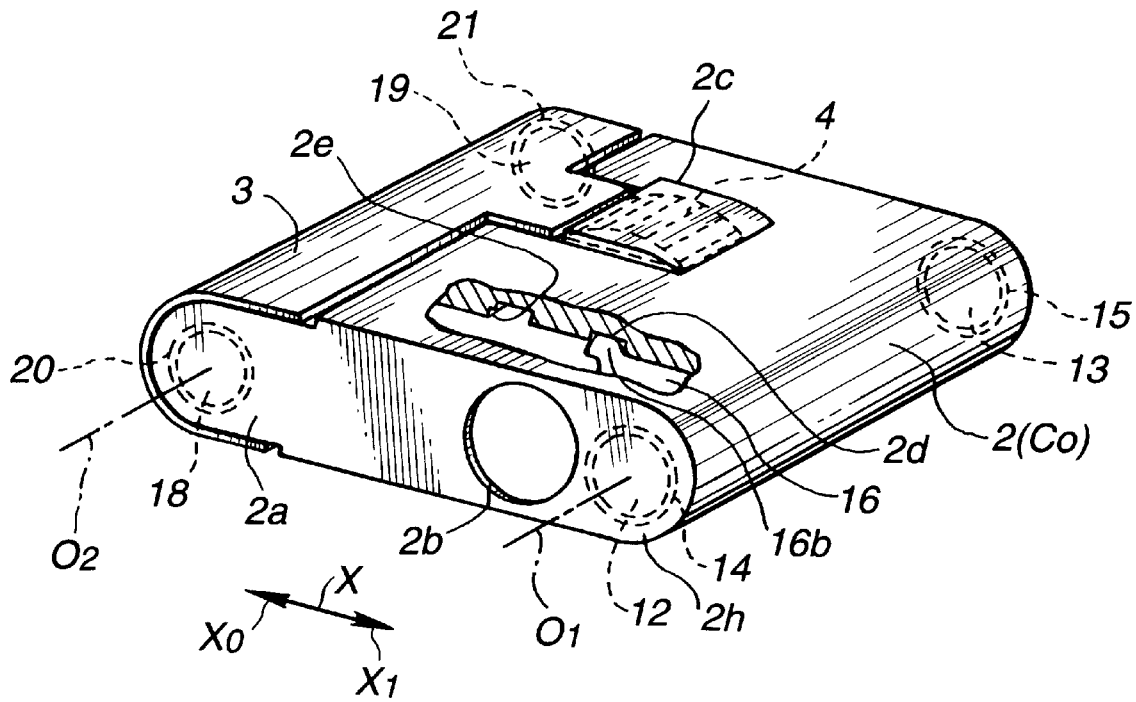
FIG. 1 is a perspective view showing an appearance of a binocular instrument taking a non-using state (storage state) according to a first embodiment of the present invention.
Figure 2:
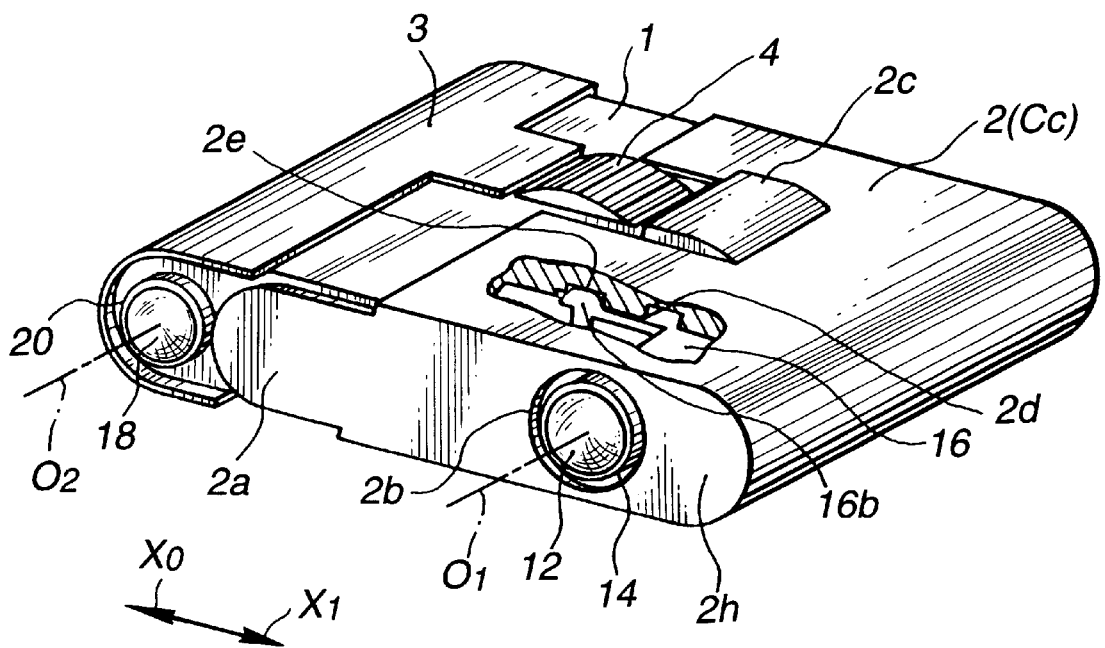
FIG. 2 is a perspective view showing an appearance of the binocular instrument, taking the use state at the minimized pupil distance, according to the first embodiment.
Figure 3:
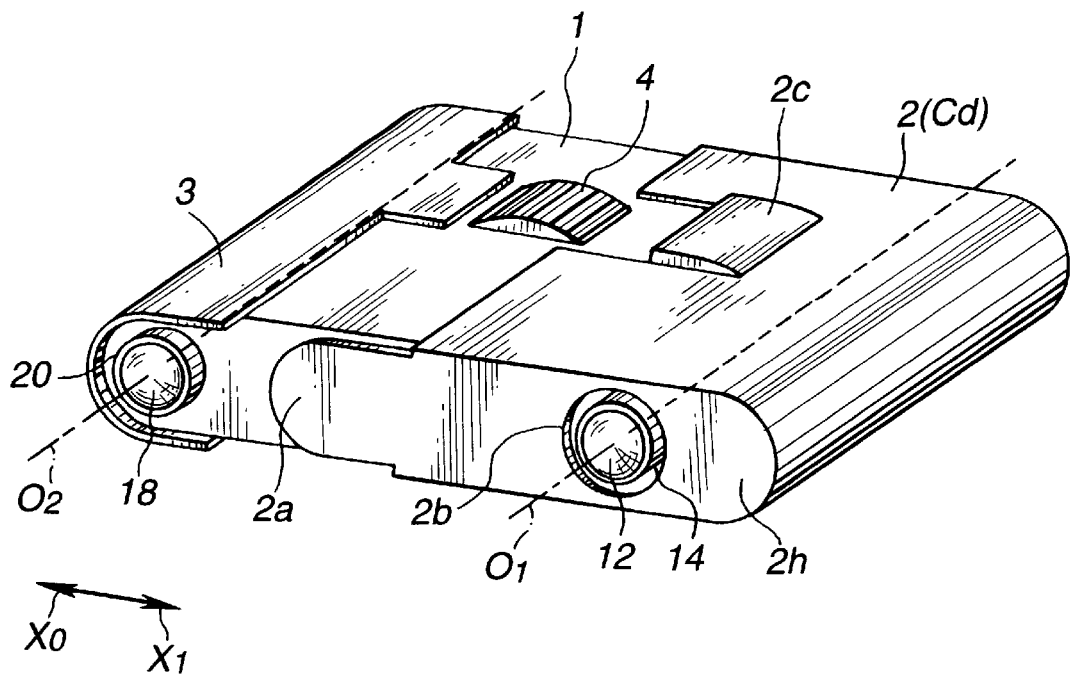
FIG. 3 is a perspective view showing the binocular instrument, taking the use state and the infinite in-focus state at the maximized pupil distance, according to the first embodiment.
Figure 4:
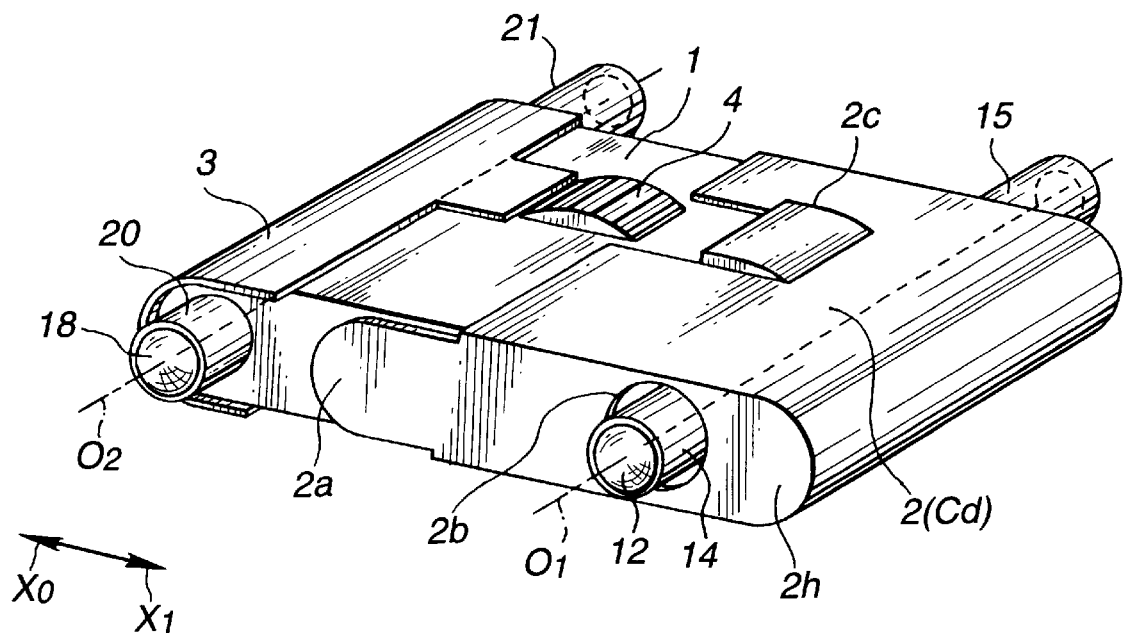
FIG. 4 is a perspective view showing an appearance of the binocular instrument, taking the use state at the maximized pupil distance and further taking a state where the lenses are drawn out up to a near in-focus position.

FIGS. 1 to 4 are illustrations of the appearances of a binocular instrument, being in various states, according to a first embodiment of this invention. FIG. 1 shows a non-using state forming a binocular instrument storage state, FIG. 2 shows the use state at the minimized pupil distance (corresponding to a distance between optical axis), FIG. 3 shows the using state and the infinite in-focus state at the maximized pupil distance, and FIG. 4 shows a state where lenses are drawn out up to a near in-focus position in the same state as that shown in FIG. 3.

The binocular instrument according to this embodiment is basically made up of a pair of left- and right-hand objective lens barrels 14 and 20 and a pair of left- and right-hand eyepiece lens barrels 15 and 21 for respectively holding objectives 12 and 18 and eyepieces 13 and 19 constituting left- and right-hand optical systems having optical axis O (optical axis O1 and O2, which will be described in more detail later), a binocular instrument body (which will be referred to hereinafter as a body) 1 accommodating an advancing/retracting mechanism section for advancing (projecting) and retracting the lens barrels and a pupil distance adjusting mechanism section (mechanism for changing the distance between the optical axis; optical-axis-separation changing mechanism), a left-hand armor 2 serving as a case member supported to be slidable in X directions (X0 direction and X1 direction, which will be described in more detail later) forming pupil distance adjusting directions perpendicular to the optical axis O and made to cover the left-hand lens barrels 14 and 15 side, and a right-hand armor 3 fixedly secured to the body 1 to the right-hand lens barrels 20 and 21 side.

In this construction, the optical axis O1 signifies an optical axis of the left-hand objective and eyepiece 14 and 15, while the optical axis O2 signifies an optical axis of the right-hand objective and eyepiece 18 and 19. The X0 direction represents a direction from the left-hand lens barrel side to the right-hand lens barrel side, while the X1 direction represents a direction from the right-hand lens barrel side to the left-hand lens barrel side and, additionally, means the pupil distance increasing direction.

Figure 5:
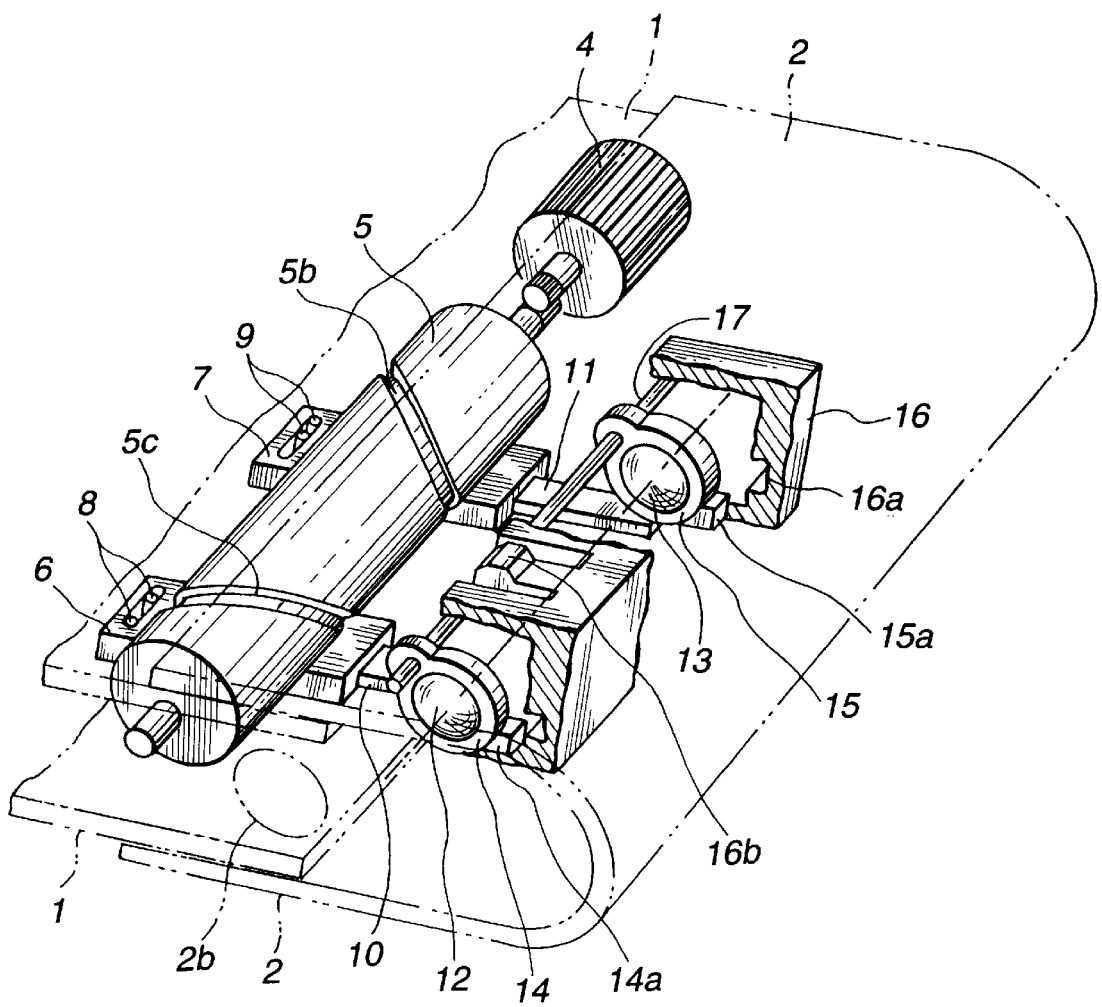
FIG. 5 is a perspective view showing a structure including lens barrels and an advancing/retracting mechanism section in the binocular instrument according to the first embodiment.
Figure 6:
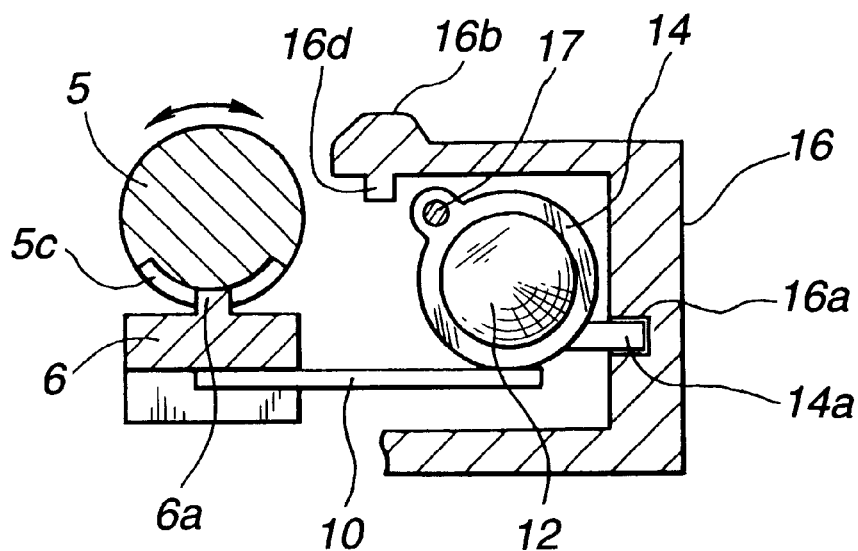
FIG. 6 is a longitudinal cross-sectional view showing the lens barrels and the advancing/retracting mechanism section in the binocular instrument according to the first embodiment, which is taken along a plane perpendicular to an optical axis.
Figure 7:
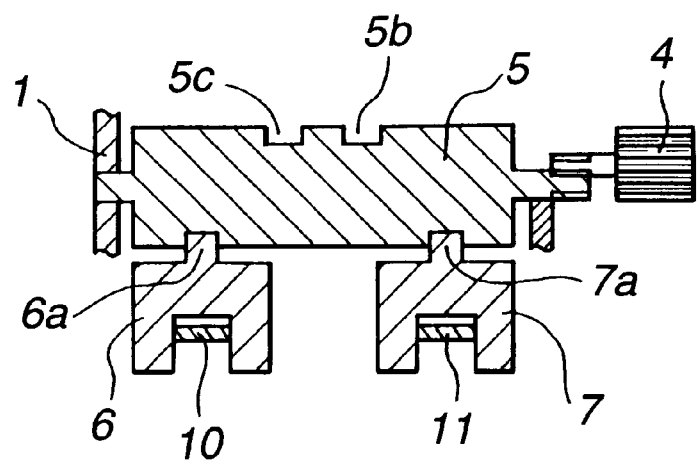
FIG. 7 is a longitudinal cross-sectional view showing the advancing/retracting mechanism section in the binocular instrument according to the first embodiment, which is taken along a plane perpendicular to an optical axis.

FIGS. 5 to 7 are illustrations of the internal structure of this binocular instrument. FIG. 5 is a perspective view showing a structure including the lens barrels and the advancing/retracting mechanism section, FIG. 6 is a longitudinal cross-sectional view showing the lens barrels and the advancing/retracting mechanism section, taken along a plane perpendicular to the optical axis, and FIG. 7 is a longitudinal cross-sectional view showing the advancing/retracting mechanism section, taken along a plane perpendicular to the optical axis.

On the aforesaid body 1, there are installed a focusing ring 4 supported to be revolvable, a cam ring 5 having cam grooves 5b and 5c and driven rotationally by the focusing ring 4, and slide mounts 6 and 7 respectively having driven pins 6a and 7a to be fitted in the cam grooves 5b and 5c and made to be slidable (capable of sliding) in directions parallel to the optical axis O through body side guide pins 8 and 9. Also installed one slide plates 10 and 11 constituting a pupil distance adjusting means (optical-axis-separation changing mechanism) supported by the slide mounts 6 and 7 to be slidable in the X directions and having a tip portion to which the left-hand objective and eyepiece lens barrels 14 and 15 are fixedly secured, a lens barrel supporting frame 16 supported with respect to the body 1 to be slidable in the X directions in a state where a predetermined frictional resistance develops with respect to the body 1, and the right-hand objective and eyepiece lens barrels 20 and 21 supported on the body 1 to be slidable only in the optical axis directions.

The lens barrel supporting frame 16 has a lens barrel guide shaft 17 and guide grooves 16a in which lens barrel projections 14a and 15a are fitted, and supports the left-hand objective and eyepiece lens barrels 14 and 15 so that they can advance and retreat in the directions of the optical axis O1. Additionally, the lens barrel supporting frame 16 itself is supported by the body 1 to be slidable in the X directions. Still additionally, the lens barrel supporting frame 16 is equipped integrally with an interlocking projection 16b serving as a lens barrel moving (interlocking) means capable of engaging with recess portions 2d and 2e of the left-hand armor 2 and displaceable due to elastic deformation and a stopper projection 16d located under the projection 16b and capable of coming into contact with a body side stopper 1a (see FIG. 8).

The aforesaid left-hand armor 2 is supported on the body 1 to be slidable from a non-using position (storage position) C0 to using positions Cc and Cd. For when it stands at the non-using position, as a lens protective section, there are provided a sheltering section 2h for covering the front surface of the left-hand objective 12, a sheltering section 2a for covering the front surface of the right-hand objective 18, a sheltering section 2i for covering the front surface of the left-hand eyepiece 12 and a sheltering section 2g for covering the front surface of the right-hand eyepiece 19.

In addition, in the left-hand armor 2, for when staying at the using positions (pupil distance minimizing position and pupil distance maximizing position) Cc and Cd, there are installed an opening section 2b for releasing the front surface of the left-hand objective 12 and an opening section 2j for releasing the front surface of the left-hand eyepiece 13. Still additionally, there are provided two recess portions 2d and 2e disposed internally along the X directions and capable of engaging with the aforesaid interlocking projection 16a and a focusing ring sheltering section 2c for covering the focusing ring 4 when lying at the aforesaid non-using position C0.

A description will be given hereinbelow of a switching operation between the non-using state and the using state and a pupil distance adjusting operation in the binocular instrument thus arranged according to this embodiment.

FIGS. 8 to 11 are longitudinal cross-sectional views showing variation of an engaging state with the lens barrel supporting frame 16 to be taken in a sliding operation of the left-hand armor 2 in this binocular instrument, while FIGS. 12 to 15 are transverse cross-sectional views showing the variation of a state occurring when the left-hand armor 2 undergoes the sliding operation, in this binocular instrument. Additionally, FIG. 16 is an illustration of the relationship between the shifted position of the left-hand armor 2 and the shifted position of the left-hand lens barrel supporting frame, and FIGS. 17 and 18 are illustrations of the variation of a shifting force (a force for a shifting operation) taking place for when the left-hand armor 2 is shifted to each of the shift positions, and. Of these figures, FIG. 17 shows the variation to be taken when it is shifted from the non-using position to the using position and further shifted in the direction of maximizing the pupil distance and FIG. 18 shows the variation thereof taking place for when the left-hand armor 2 is shifted from the pupil distance maximizing position to the pupil distance minimizing position and further returned from the using position to the non-using position.

Figure 8:
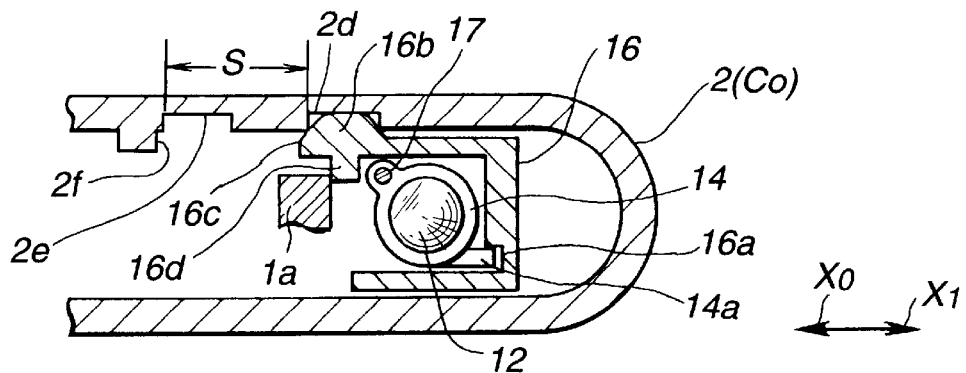
FIG. 8 is a longitudinal cross-sectional view showing variation of an engaging state with a lens barrel supporting frame to be taken when a left-hand armor undergoes a sliding operation, in the binocular instrument according to the first embodiment which is now in a non-using state.
Figure 9:
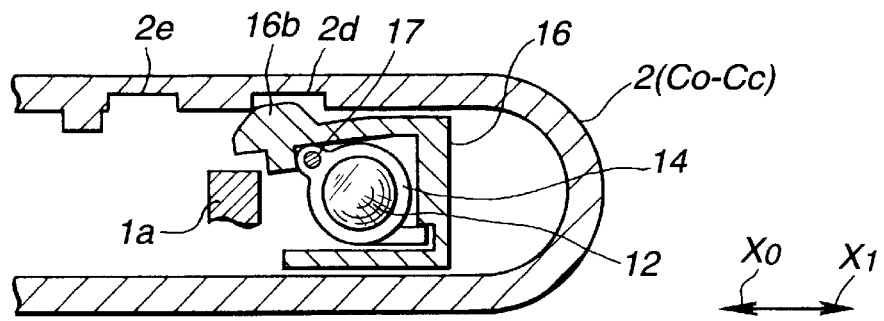
FIG. 9 is a longitudinal cross-sectional view showing the variation of the engaging state with the lens barrel supporting frame taking place when the left-hand armor undergoes a sliding operation, in the binocular instrument according to the first embodiment, and showing a state of switching from the non-using state to the using state.
Figure 10:
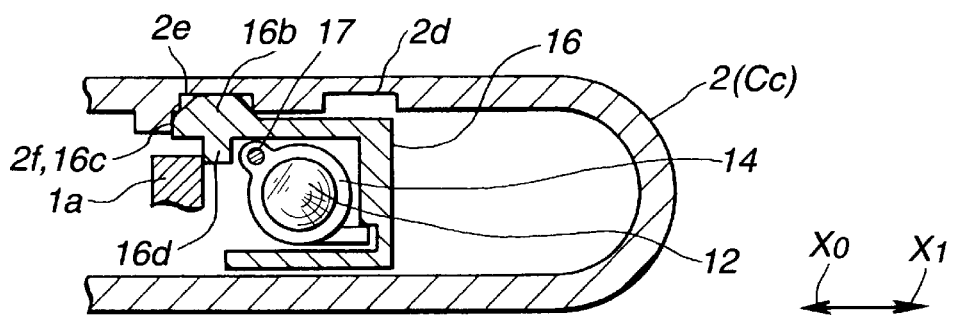
FIG. 10 is a longitudinal cross-sectional view showing the variation of the engaging state with the lens barrel supporting frame occurring when the left-hand armor undergoes a sliding operation, in the binocular instrument according to the first embodiment, and showing a state immediately after the switching to the using state.
Figure 11:
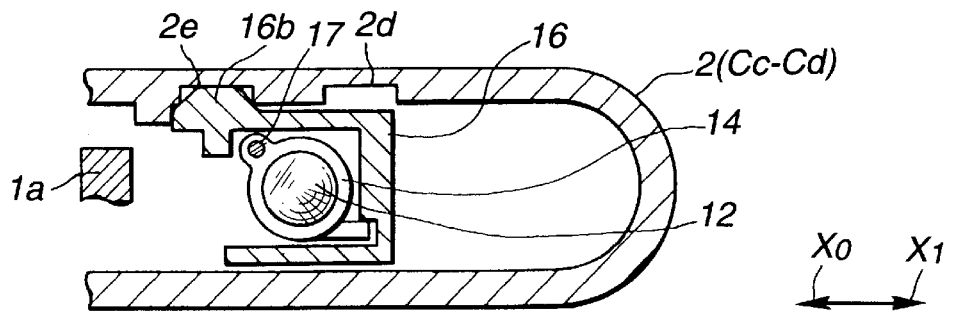
FIG. 11 is a longitudinal cross-sectional view showing the variation of the engaging state with the lens barrel supporting frame occurring when the left-hand armor undergoes a sliding operation, in the binocular instrument according to the first embodiment, and showing a state at a pupil distance adjusted position in the using state.
Figure 12:
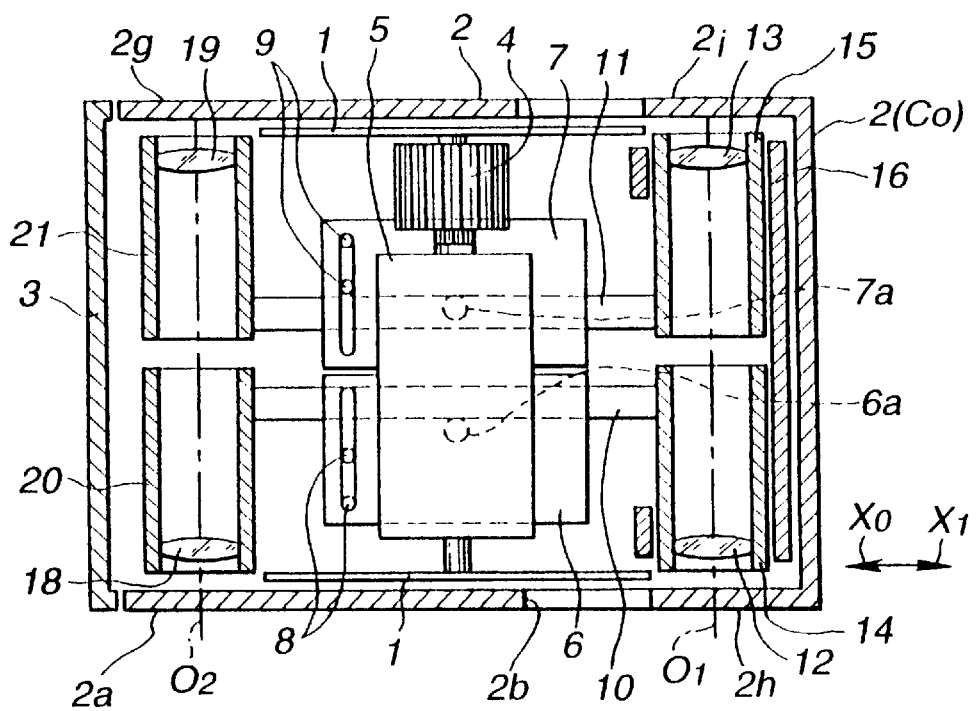
FIG. 12 is a transverse cross-sectional view showing the variation of a state occurring when the left-hand armor undergoes a sliding operation, in the binocular instrument according to the first embodiment, which is now in the non-using state.
Figure 13:
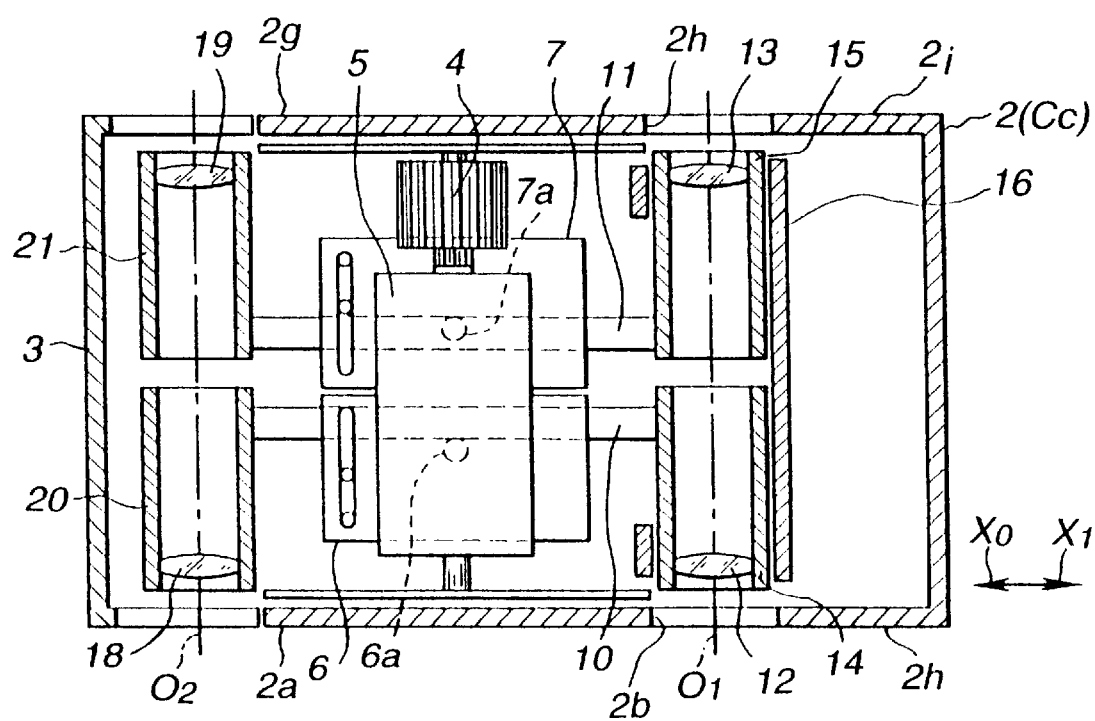
FIG. 13 is a transverse cross-sectional view showing the variation of a state taking place when the left-hand armor undergoes a sliding operation, in the binocular instrument according to the first embodiment, which takes the minimized pupil distance in the non-using state.
Figure 14:
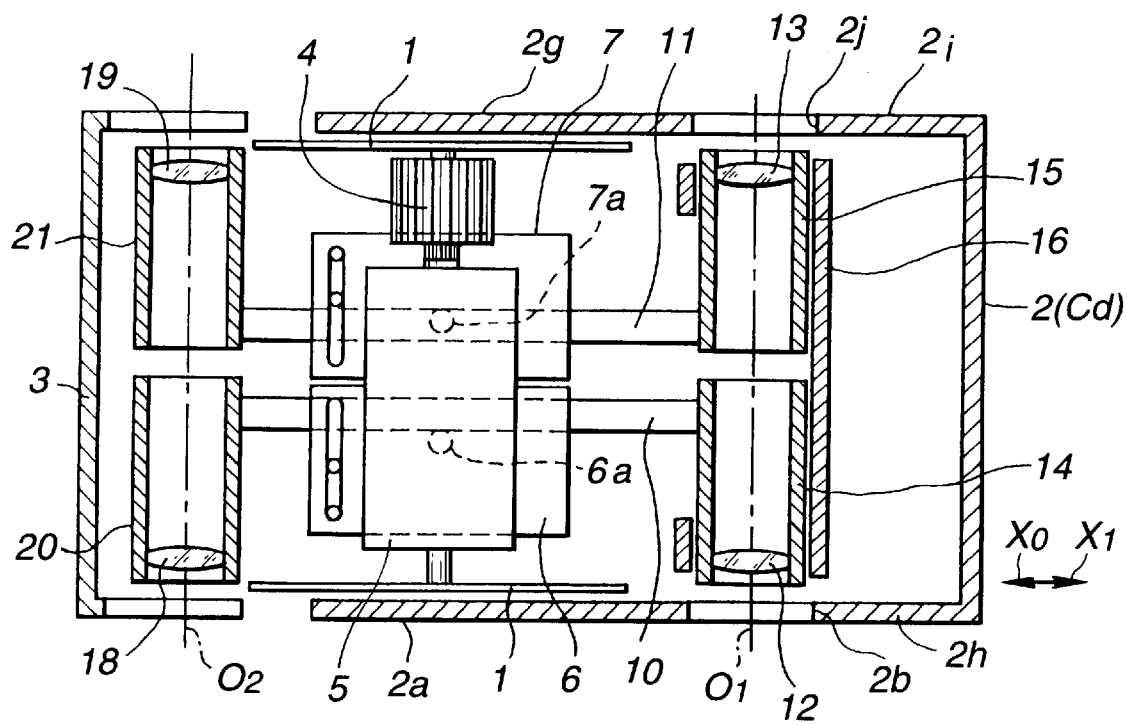
FIG. 14 is a transverse cross-sectional view showing the variation of a state occurring when the left-hand armor undergoes a sliding operation, in the binocular instrument according to the first embodiment, which takes the maximized pupil distance in the non-using state, and where the lenses are at the infinite in-focus position.
Figure 15:
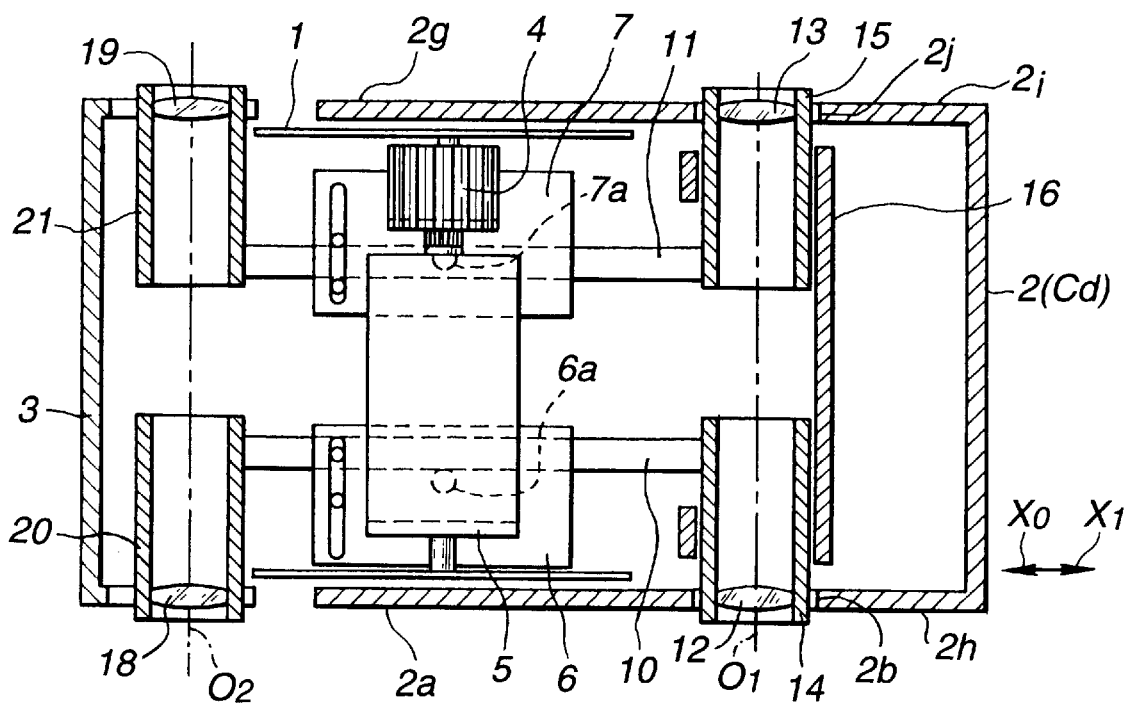
FIG. 15 is a transverse cross-sectional view showing the variation of a state occurring when the left-hand armor undergoes a sliding operation, in the binocular instrument according to the first embodiment, which takes the maximized pupil distance in the non-using state, and where the lenses are at the nearest in-focus position.

FIGS. 8 and 12 illustrate the state in the perspective view of FIG. 1, and shows a state where the left-hand armor 2 is at the non-using position C0. FIG. 9 illustrates a state to be taken between the states in the perspective views of FIGS. 1 and 2, and shows a state to be taken for when the left-hand armor 2 is in a condition to be taken between the non-using position C0 and the pupil distance minimizing position Cc forming the using position. FIGS. 10 and 13 illustrate the state in the perspective view of FIG. 2, and show a state to be taken for when the left-hand armor 2 stands at the pupil distance minimizing position Cc forming the using position. FIG. 11 illustrates a state to be taken between the states of the perspective views of FIG. 2 and FIGS. 3 and 4, and shows a state to be taken for when the left-hand armor 2 is at a using position between the pupil distance minimizing position Cc and the pupil distance maximizing position Cd. FIGS. 14 and 15 illustrate the state in the perspective views of FIGS. 3 and 4, and respectively show the lens drawing-in state (infinite focusing) and the lens drawing-out state (near focusing state) when the left-hand armor 2 is at the pupil maximizing position Cd forming the using position.

When the binocular instrument is in the non-using state, as shown in FIGS. 1 and 12, the left-hand armor 2 is at the non-using position C0. The left- and right-hand objectives 12 and 18 and the left- and right-hand eyepieces 13 and 19 held in the lens barrels 14, 20 and 15, 21 drawn in to the retreated position are sheltered by a sheltering section of the left-hand armor 2. Additionally, as shown in FIG. 8, the interlocking projection 16b of the lens barrel supporting frame 16 is fitted in the recess portion 2d of the body 1. Still further, the focusing ring 4 is covered with the focusing ring sheltering section 2c of the left-hand armor 2.

Meanwhile, a stopping force in the X1 direction for the interlocking projection 16b to engage with the front inclined surface of the recess portion 2d is the holding force of the left-hand armor 2 at the non-using position C0, and will be referred to hereinafter as a projection stopping force Pb. A frictional force in the X directions develops between the body 1 and the lens barrel supporting frame 16 and works on the lens barrel supporting frame 16, and will be referred to hereinafter as a supporting frame sliding resistance force P0. Additionally, a sliding force for the interlocking projection 16b to slide on the inner surface of the body 1 will be referred to hereinafter as a projection sliding resistance force P2. Still additionally, the aforesaid supporting frame sliding resistance force P0 is set to be larger than the projection stopping force Pb and the projection sliding resistance force P2.

For bringing this binocular instrument to the using state, the left-hand armor 2 is slid in the X1 direction with respect to the body 1. Since the lens barrel supporting frame 16 is supported on the body 1 by the X-direction supporting frame frictional force P0 higher than the projection stopping force Pb, the left-hand armor 2 is shifted in the X1 direction while the interlocking projection 16b of the lens barrel supporting frame 16 is slid on the inner surface of the body 1. During the movement of this left-hand armor 2, the positions of the left-hand lens barrels 14 and 15 in the X directions do not vary (see FIG. 16). At this time, the shifting force of the left-hand armor 2 is a shifting force P2 (see FIG. 17).

When a predetermined movement S forming the separation between the recess portions 2d and 2e takes place, as shown in FIG. 10, the interlocking projection 16b of the lens barrel supporting frame 16 is fitted in the recess portion 2e of the left-hand armor 2. At this time, the position of the left-hand armor 2 is the minimum pupil distance using position Cc, and the left-hand objective and eyepiece lens barrels 14 and 15 are at a minimum pupil distance lens barrel position Cc (see FIG. 16). Furthermore, as shown in FIGS. 2 and 13, the front surfaces of the left- and right-hand objectives 12 and 18 and the left- and right-hand eyepieces 13 and 19 are opened fully.

In fact, at a near position Cb on the front side (X0 direction) of the minimum pupil distance using position Cc, the front surfaces of the left- and right-hand objectives 12 and 18 and the left- and right-hand eyepieces 13 and 19 come into the open conditions. This position Cb can be on the front side (X0 direction) of the position Ca. Additionally, it is also possible that the using position Cc and the lensopening position Cb coincide completely with each other.

In the aforesaid using state, the focusing ring 4 also appears, and the observation and the focusing become possible, and further the left- and right-hand lens barrels 14, 20 and 15, 21 can be drawn out.

As shown in FIG. 17, at the position Ca of the left-hand armor 2 immediately before the engagement of the interlocking projection 16b with the aforesaid recess portion 2e, the shifting force of the left-hand armor 2 once decreases to the force Pc. Furthermore, after the complete engagement at the using position Cc, the shifting force of the left-hand armor 2 substantially equals the supporting frame sliding resistance force P0.

For enlarging the pupil distance in the aforesaid using state, the left-hand armor 2 is further slid in the X1 direction from the state shown in FIGS. 2 and 13, thus reaching the pupil distance maximizing position Cd in the state shown in FIGS. 3 and 14.

That is, as shown in FIG. 11, the left-hand armor 2 is shifted in the X1 direction while the interlocking projection 16b of the lens barrel supporting frame 16 is fitted in the recess portion 2e of the left-hand armor 2. At this time, since the tip portion 16c of the interlocking projection 16b is brought into contact with a vertical end surface 2f of the recess portion 2e, the engaging force is greater than the supporting frame sliding resistance force P0, and the left-hand armor 2 and the lens barrel supporting frame 16 supporting the left-hand lens barrels 14 and 15 moves integrally in the engaging state (see FIG. 16), so that the left-hand objective and eyepiece lens barrels 14 and 15 reaches the pupil distance maximizing lens barrel position Cd. Additionally, during that operation, the open conditions of the left- and right-hand objectives and eyepieces 12, 13, 18 and 19 are maintained. Moreover, when the left-hand armor 2 is at the pupil distance minimizing position Cc and the pupil distance maximizing position Cd, it is held by the supporting frame sliding resistance force P0 producing a moderate holding force. The engaging and stopping force between the interlocking projection 16 and the recess portion 2e of the left-hand armor 2 in the X1 direction is extremely large, because the tip portion 16c and the left-hand armor projection 2f come into contact with each other, exceeding the supporting frame sliding resistance force P0.

Between the minimum pupil distance state shown in FIGS. 2 and 13 and the maximum pupil distance state shown in FIGS. 3 and 14, the rotational operation of the focusing ring 4 is possible, and with this rotational operation, the cam ring 15 rotates and the driven pins 6a and 7a move forwardly and backwardly so that the left- and right-hand lens barrels 14, 15, 18 and 21 are drawn out for focusing. FIGS. 4 and 15 show a state where the objectives 12 and 18 and the eyepieces 15 and 19 are drawn out in the adjusted state to the maximum pupil distance.

Furthermore, in the case of returning this binocular instrument from the adjusted maximum pupil distance state to the adjusted minimum pupil distance state, the left-hand armor 2 is shifted in the X0 direction from the pupil distance maximizing position Cd to the pupil distance minimizing position Cc in the using position range. Also in this case, since the stopping force to the interlocking projection 16b is greater than the sliding resistance force P0, the engaging state between the interlocking projection 16b and the recess portion 2e is maintainable. When the left-hand armor 2 reaches the pupil distance minimizing position Cc (see FIG. 10), the stopper projection 16d lying under the interlocking projection 16b comes into contact with the body stopper 1a so that, as shown in FIG. 18, the operational resistance force rises to a force Pa owing to the interlocking projection 16b being in the engaging condition. Accordingly, the recognition of the fact of the arrival at the pupil distance minimizing position Cc becomes possible.

Thus, in the case of switching to the non-using state, the left-hand armor 2 is slid in the X0 direction from the using position (pupil distance minimizing position) Cc. The stopper projection 16d comes into contact with the body stopper 1a so that the interlocking projection 16b deforms and gets out of the recess portion 2e to be released.

Moreover, when the left-hand armor 2 is shifted in the X0 direction, the lens barrel supporting frame 16 returns through the state shown in FIG. 9 to the state shown in FIGS. 1, 8 and 12 while continuing the stopping condition. The left- and right-hand objectives and eyepieces 12, 13, 18 and 19 are covered with the sheltering section of the left-hand armor 2, and the focusing ring 4 also reaches the non-using position C0 producing the covered condition. At this time, as shown in FIG. 8, the operational resistance force Pd once decreases and the interlocking projection 16d comes in the recess portion 2d. After the insertion, the left-hand armor 2 is maintained at the stopping force Pb.

With the above-described binocular instrument according to this embodiment, the switching to the using state where the lenses and the focusing ring are released or to the non-using state where they are sheltered is achievable by the sliding operation of the left-hand armor 2 forming a case member, and the pupil distance adjustment can be done by operations in the same direction, whereupon quick switching to the viewing state becomes feasible. Additionally, the lens sheltering sections and the focusing ring sheltering section are provided together on the left-hand armor 2, which realizes simple structure, size reduction and low cost.

Secondly, a description will be given hereinbelow of a second embodiment of the present invention.

A feature of a binocular instrument according to this embodiment is that, in the above-described binocular instrument according to the first embodiment, a push button is provided so that the left-hand armor is released from the engagement with the lens barrel supporting frame to allow the lenses to be sheltered. In the above-described binocular instrument according to the first embodiment, when switching from the using state to the non-using state, the left-hand armor 2 is operated continuously from the using position Cc and slid in the X0 direction to present the non-using state. However, at that time, if the left- and right-hand lens barrels 14 and 20 are drawn out to the exterior of the left-hand armor 2 as shown in FIG. 4, the left-hand armor 2 contacts a side surface portion of these lens barrels, which can cause problems.

For this reason, in the binocular instrument according to this embodiment, for the purpose of eliminating such problems, at the switching from the using state to the non-using state, a stopper works to once hinder the movement of the left-hand armor to the non-using position. At this time, the user can confirm the fact that the lens barrels are not drawn out. If drawn out, after the drawing-in, the left-hand armor is slid to the non-using position C0.

Figure 19:
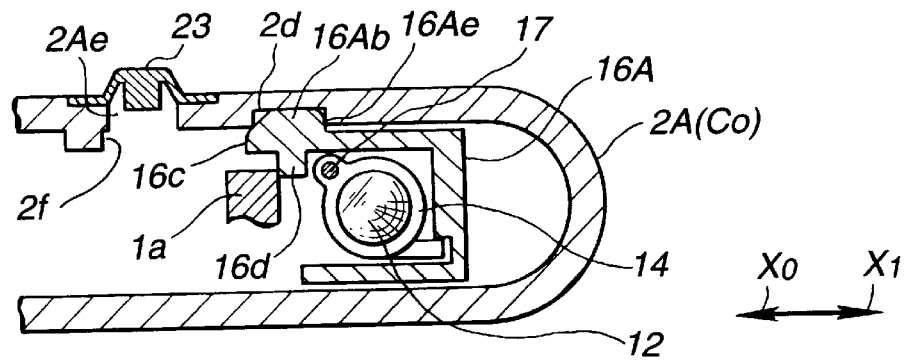
FIG. 19 is a longitudinal cross-sectional view showing variation of an engaging state with a lens barrel supporting frame, occurring in conjunction with a sliding operation of a left-hand armor, in a binocular instrument according to a second embodiment of this invention which is now in a non-using state.
Figure 20:
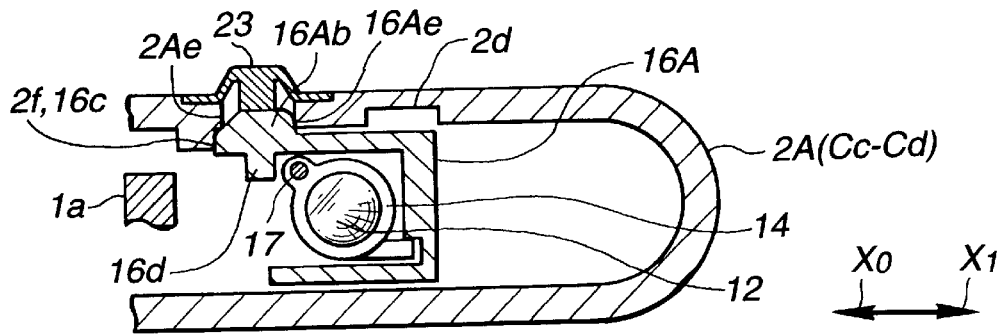
FIG. 20 is a longitudinal cross-sectional view showing the variation of an engaging state with the lens barrel supporting frame, occurring in conjunction with a sliding operation of the left-hand armor, in the binocular instrument according to the second embodiment, illustrating the using state under pupil distance adjustment.
Figure 21:
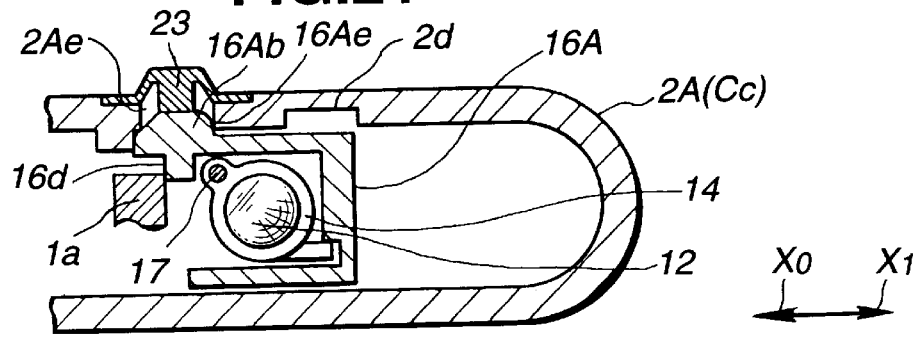
FIG. 21 is a longitudinal cross-sectional view showing the variation of the engaging state with the lens barrel supporting frame, occurring in conjunction with a sliding operation of the left-hand armor, in the binocular instrument according to the second embodiment, illustrating the using state at the minimized pupil distance.
Figure 22:
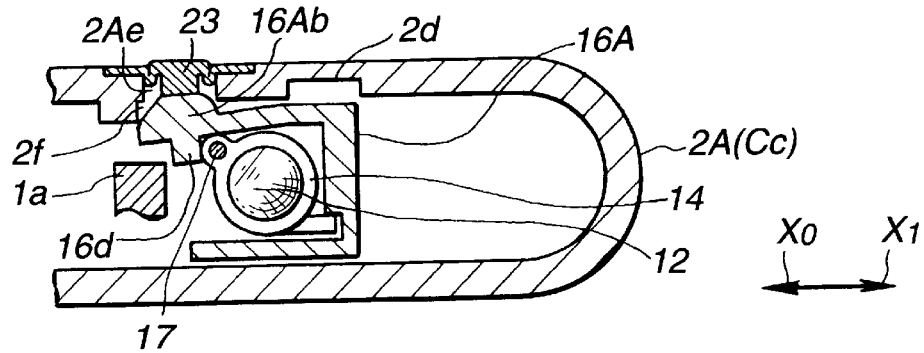
FIG. 22 is a longitudinal cross-sectional view showing the variation of the engaging state with the lens barrel supporting frame, occurring in conjunction with a sliding operation of the left-hand armor, in the binocular instrument according to the second embodiment, illustrating a state where a push button is operated in the using state at the minimized pupil distance.

FIGS. 19 to 22 are longitudinal cross-sectional views showing variation of an engaging state with the lens barrel supporting frame 16 at the sliding operation of the left-hand armor 2A of this binocular instrument. FIGS. 19 and 20 show the state where the left-hand armor 2A is at the non-using position C0 and a state where it exists between the pupil distance (corresponding to the distance between the optical axis) minimizing position and the pupil distance maximizing position. FIG. 21 shows the state where the left-hand armor 2A is shifted from the pupil distance maximizing position to the using position Cc forming the pupil distance minimizing position, and illustrates the state where the movement thereof in the X0 direction is inhibited by the body stopper 1a. FIG. 22 shows the state where the push button is pressed to release the left-hand armor from the engagement with the interlocking projection for allowing the left-hand armor to move to the non-using position.

In the binocular instrument according to this embodiment, the left-hand armor 2A has, in its upper surface side, a recess portion 2d and an opening portion 2Ae corresponding to the recess portion 2d and the recess portion 2e, respectively, of the first embodiment. Additionally, a push button 23, operable by pressing, is placed in the opening section 2Ae. Still additionally, an interlocking projection 16Ab, displaceable due to elastic deformation, is provided on a lens barrel supporting frame 16A, while a non-titled corner portion 16Ae is formed on a rear end portion of this projection 16Ab. The other structure is the same as that of the above-described first embodiment, and the description of the same components will be made with the same reference numerals.

In this binocular instrument, at the switching from the using state shown in FIG. 20 to the non-using state shown in FIG. 19, the left-hand armor 2A is slid in the X0 direction. As shown in FIG. 21, the stopper projection 16d of the interlocking projection 16Ab comes into contact with the body stopper 1a at the using position Cc forming the pupil distance minimizing position, and the corner portion 16Ae of the interlocking projection 16Ab interferes with an inner surface of the opening portion 2Ae of the left-hand armor 2A so that the left-hand armor 2A is inhibited in the movement of the X0 direction in this state. The user confirms that the left- and right-hand lens barrels 14, 15, 20 and 21 are not drawn out. If drawn out, the focusing ring 4 is operated so that all the lens barrels are drawn into the body.

Thus, by pressing the push button 23, the interlocking projection 16b and the opening portion 2Ae of the left-hand armor 2A are released from their engagement, and the left-hand armor 2A is slid in the X0 direction up to the non-using position C0, thereby presenting the non-using state.

With the above-described binocular instrument according to this embodiment, when returning to the non-using state, the left-hand armor 2A is compulsorily stopped at the using position Cc forming the pupil distance minimizing position. At this time, it is possible to check the drawing-out state of the lens barrels, so that safety movement of the left-hand armor 2A to the non-using position becomes possible. Accordingly, it is possible to prevent the occurrence of problems, for instance, a problem that the left-hand armor 2A damages the side surfaces of the lens barrels, which improves the ease-to-use.

In addition, in the binocular instruments according to this invention, it is also appropriate that the lens protective section is made to protect one of the objective side and the eyepiece side or to protect both the objective side and eyepiece side.

As described above, with the binocular instrument according to this invention, the switching to the using state releasing the lenses or to the non-using state sheltering the lenses and the pupil distance adjustment are achievable by the shifting operation of the case member in the same direction, which presents a device that is easy-to-operate easy-to-use and has low manufacturing cost.

What is claimed is:

1. A binocular instrument comprising:

a pair of left- and right-hand lens barrels each including a lens optical system;

an optical-axis-separation changing mechanism for changing a distance between optical axis of said pair of left- and right-hand lens barrels;

armor for covering said pair of lens barrels; and lens protective section formed integrally on said armor and movable to a closing position for covering an exposing surface of said lens optical system for protection and further to an opening position for causing said exposing surface thereof to appear, wherein said lens protective section is driven in connection with said optical-axis-separation changing mechanism.

2. A binocular instrument according to claim 1, wherein said lens protective section is made to protect at least one of an eyepiece side of said lens optical system and an objective side thereof.

3. A binocular instrument according to claim 1, wherein said lens protective section includes an eyepiece lens protective section for covering an exposed surface of an eyepiece side of said optical system and an objective lens protective section for covering an exposed surface of an objective side thereof.

4. A binocular instrument comprising:

a pair of left- and right-hand lens barrels each including a lens optical system;

an optical-axis-separation changing mechanism for changing a distance between optical axis of said paid of left- and right-hand lens barrels;

armor for covering said pair of lens barrels; and lens protective section formed integrally on said armor and movable to a closing position for covering an exposing surface of said lens optical system for protection and further to an opening position for causing said exposing surface thereof to appear, wherein said optical-axis-separation changing mechanism has a first transition range in which said binocular instrument is changed to a storage state and a using state and a second transition range in which said distance between said optical axis is changed within a predetermined range in said using state, and, in connection with a movement of said optical-axis-separation changing mechanism within said first area, said lens protective section is moved to said closing position in said storage state and is moved to said opening position in said using state.

5. A binocular instrument according to claim 4, further comprising:
   a connecting member for establishing a connection between said armor and said lens barrel; and
   a connection releasing member for releasing said armor and said lens barrel from the connection in said first transition range.

6. A binocular instrument comprising:
   a pair of left- and right-hand lens barrels each including a lens optical system;
   a pair of armors for covering said pair of lens barrels; and
   an optical-axis-separation changing mechanism for changing a distance between optical axis of said pair of left- and right-hand lens barrels,
   wherein said optical-axis-separation changing mechanism has a first range in which said binocular instrument is changed to a storage state and a using state and a second range in which said distance between said optical axis is changed within a predetermined range in said using state, and, in said first range, one of said armors and one of said lens barrels are moved integrally while the other armor and the other lens barrel are moved relatively.

7. A binocular instrument comprising a pair of left- and right-hand lens barrels each including a lens optical system, pupil distance adjusting means for changing a distance between optical axis of said pair of lens barrels and a case member, wherein said case member is movable operationally relative to said pair of lens barrels in the same direction as the direction of changing said distance between said optical axis, and is equipped integrally with a lens protective section movable to a closing position for protecting an exposing surface of said lens optical system of each of said pair of lens barrels and further to an opening position for causing said exposing surface of said lens optical system to appear and an armor for covering said lens protective section and said lens barrels.

8. A binocular instrument comprising:
   a pair of left- and right-hand lens barrels each including a lens optical system;
   a pupil distance adjusting mechanism for changing a distance between optical axis of said pair of lens barrels for a minimum position presenting a shortest optical-axis-distance and further for a maximum position presenting a longest optical-axis-distance;
   armor for covering said pair of lens barrels;
   a lens protective member formed integrally with said armor and movable relative to said pair of lens barrels and movable operationally to a closing position for covering an exposing surface of said lens optical system of each of said pair of lens barrels for protection and further to an opening position for causing said exposing surface thereof to appear; and
   interlocking means for making said pupil distance adjusting mechanism move integrally with one of said pair of lens barrels in accordance with an operational movement of said lens protective member from said opening position in a direction different from a direction to said closing position.

9. A binocular instrument having a pair of left-and right-hand lens barrels each including a lens optical system and movable to a storage state in which a distance between optical axis of said optical systems of said pair of lens barrels is minimized and to a using state in which said optical-axis-distance is changed to adjust a pupil distance of said optical systems, said binocular instrument comprising:
   lens barrels moving means for moving said pair of optical systems to change said optical-axis-distance between said pair of optical systems;
   a case member covering said lens barrels and including a pair of left- and right-hand lens protective means for covering exposing surfaces of said optical systems to protect said exposing surfaces of said optical systems in said storage state;
   barrel interlocking means for producing said using state by moving said lens protective means by a predetermined distance in a direction of exposing said exposing surfaces of said optical systems from a position for protection of said exposing surface thereof, and further for moving said lens barrels in an interlocking condition for desired pupil distance adjustment by moving said lens protective means by a desired distance in said exposing direction in said using state; and
   a lens optical-axis-direction shifting member for drawing in and out at least a portion of said pair of optical systems in a direction of an optical axis when operated,
   wherein, in said storage state, said lens optical-axis-direction shifting member is covered with said case member.

10. A binocular instrument having a pair of left- and right-hand lens barrels each including a lens optical system and movable to a storage state in which a distance between optical axis of said optical systems of said pair of lens barrels is minimized and to a using state in which said optical-axis-distance is changed to adjust a pupil distance of said optical systems, said binocular instrument comprising:
    lens barrel moving means for moving said pair of optical systems in a predetermined direction to change said optical-axis-distance between said pair of optical systems;
    a lens protective cover serving as an armor member for said lens barrels of said binocular instrument and made to cover exposing surfaces of said optical systems for protection in said storage state; and
    cover moving means for producing said using state by shifting said lens protective cover in the same direction as said predetermined direction from a position, at which said exposing surfaces of said optical systems are protected, to expose said exposing surfaces thereof.

11. A binocular instrument having a pair of left- and right-hand lens barrels each including a lens optical system and movable to a storage state in which a distance between optical axis of said optical systems of said pair of lens barrels is minimized and to a using state in which said optical-axis-distance is changed to adjust a pupil distance of said optical systems, said binocular instrument comprising:
    lens barrel moving means for moving said pair of optical systems to change said optical-axis-distance between said pair of optical systems;
    lens protective means for covering exposing surfaces of said optical systems for protection in said storage state; and
    interlocking means for producing said using state by moving said lens protective means by a predetermined distance in a direction of exposing said exposing surfaces of said optical systems from a position for protection of said exposing surface thereof, and further for moving said lens barrels in an interlocking condition for desired pupil distance adjustment by moving said lens protective means by a desired distance in said exposing direction in said using state wherein, within a pupil distance adjustment range in said using state one of said pair of lens barrels and said lens protective means are moved integrally.

12. A binocular instrument according to claim 11, further comprising an armor case member for covering at least one of said lens barrels, with said lens protective means being formed on said armor case member, and a lens optical-axis-direction shifting member for drawing in and out at least a portion of said pair of optical systems in a direction of an optical axis when operated, so that said lens optical-axis-direction shifting member is covered with said armor case member in said storage state.

13. A binocular instrument comprising:

a pair of left- and right-hand lens barrels each including a lens optical system; and an operating member supported to be movable operationally in a direction of changing a distance between optical axis of said pair of left- and right-hand lens barrels, and made to operate in an opening and closing range in which it moves, relative to said pair of lens barrels, between a closing position for covering said optical systems of said pair of lens barrels for protection with a lens cover formed integrally with a binocular case and an opening position for causing exposing surfaces of said optical systems to appear, and to operate in a pupil distance changing range in which it moves said pair of lens barrels to a minimum position presenting a shortest optical-axis-distance and to a maximum position presenting a longest optical-axis-distance.

14. A binocular instrument comprising:

a first lens barrel including a first optical system;

a second lens barrel including a second optical system;

a first armor for covering said first lens barrel;

a second armor which covers said second lens barrel and can move together with said second lens barrel relative to said first lens barrel and said first armor;

a first optical system protective section which is integrally provided to said first armor and can take a closing position for protecting an exposing surface of said first optical system when in a storage state and an opening position for causing said exposing surface to appear when in a using state;

a second optical system protective section which is integrally provided to said first armor and can take a closing position for protecting an exposing surface of said second optical system when in said storage state and an opening position for causing said exposing surface to appear when in said using state;

an optical-axis-separation changing mechanism having a first range in which said binocular instrument is changed to said storage state and said using state and a second range in which the distance between optical axes of said first optical system and said second optical system is changed in said using state;

a connecting mechanism for releasing said first lens barrel and said first armor from the connection in said first range to enable said first lens barrel and said first armor to be moved relatively while establishing the connection between said first lens barrel and said first armor in said second range to enable said first lens barrel and said first armor to be moved integrally.

15. A binocular instrument according to claim 14, in which said connecting mechanism includes an engaging portion which can move integrally with said first lens barrel and engage said first armor; a first engaging groove provided in said first armor which said engaging portion engages when in said storage state; a second engaging groove provided in said first armor which said engaging portion engages when in said using state; and a stopper portion which works to hinder the movement of said first lens barrel to the side of said second optical system with respect to said first armor when changing from said using state to said storage state in said first range, wherein said engaging portion engages said first engaging groove in said storage state thereby to retain said storage state, said engaging portion disengages said first groove when changed from said storage state to said using state in said first range thereby to enable said first lens barrel and said first armor to be moved relatively, said engaging portion engages said second engaging groove in said second range as said using state thereby to enable said first lens barrel and said first armor to be moved integrally, and said stopper portion hinders the movement of said first lens barrel when changed from said using state to said storage state in said first range thereby to enable said first lens barrel and said first armor to be moved relatively.

* * * * *